(12) United States Patent
Modi et al.

(10) Patent No.: US 9,531,231 B2
(45) Date of Patent: Dec. 27, 2016

(54) RADIALLY OFFSET MOTOR CONTROL HOUSING

(71) Applicant: Nidec Motor Corporation, St. Louis, MO (US)

(72) Inventors: Chetan O. Modi, Valley Park, MO (US); Arthur E. Woodward, Manchester, MO (US); Michael T. Collins, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 107 days.

(21) Appl. No.: 14/321,640

(22) Filed: Jul. 1, 2014

(65) Prior Publication Data

US 2016/0006316 A1    Jan. 7, 2016

(51) Int. Cl.
*H02K 5/22* (2006.01)

(52) U.S. Cl.
CPC ............... *H02K 5/22* (2013.01); *H02K 11/33* (2016.01)

(58) Field of Classification Search
USPC ................................................ 310/43, 71, 89
See application file for complete search history.

(56) References Cited

U.S. PATENT DOCUMENTS

| | | | | |
|---|---|---|---|---|
| 4,019,704 A * | 4/1977 | Levine | ..................... | H02K 5/00 248/230.9 |
| 4,525,655 A * | 6/1985 | Walker | ................... | H02K 7/116 310/112 |
| 4,801,831 A * | 1/1989 | Lewis | ...................... | H02K 5/04 310/89 |
| 5,006,748 A * | 4/1991 | Wintermute | ............ | H02K 1/12 310/194 |
| 6,707,185 B2 * | 3/2004 | Akutsu | ................ | B62D 5/0406 310/68 B |
| 7,021,418 B2 * | 4/2006 | Tominaga | ............ | B62D 5/0406 180/444 |
| 7,474,024 B2 * | 1/2009 | Nakanishi | .............. | H05K 3/284 310/64 |
| 7,923,875 B2 * | 4/2011 | Henry | .................... | H02K 5/225 310/64 |
| 8,421,288 B2 | 4/2013 | Tang et al. | | |
| 2004/0020923 A1 * | 2/2004 | Collins | .................. | B01J 19/126 219/687 |
| 2007/0285035 A1 * | 12/2007 | Roither | ................ | A47C 20/041 318/120 |
| 2008/0174213 A1 * | 7/2008 | Peterson | ................ | H02K 11/33 310/68 R |
| 2008/0278013 A1 * | 11/2008 | Umehara | ................. | H02K 5/26 310/81 |

(Continued)

*Primary Examiner* — Naishadh Desai
(74) *Attorney, Agent, or Firm* — Hovey Williams LLP

(57) ABSTRACT

A motor comprising a rotor, a stator, a motor shell, a pair of motor endshields, and a controller housing is provided. The rotor is rotatable about an axis. The stator presents opposite axial ends. The motor shell extends around the axis to at least partly circumscribe the rotor and stator. Each motor endshield is positioned adjacent a respective one of the stator ends and provides support for the rotor. The fastener extends through and interconnects the stator and endshields. The controller housing defines an electronics compartment positioned radially outside the motor shell. The controller housing includes a connector that receives the fastener so as to fix the controller housing to the stator and endshields.

25 Claims, 13 Drawing Sheets

(56) References Cited

U.S. PATENT DOCUMENTS

| | | | |
|---|---|---|---|
| 2010/0084933 A1* | 4/2010 | Ishikawa | F01C 21/10 |
| | | | 310/89 |
| 2012/0133223 A1 | 5/2012 | Liu et al. | |
| 2012/0286630 A1* | 11/2012 | Tomizawa | H02K 5/225 |
| | | | 310/68 D |
| 2013/0106217 A1* | 5/2013 | Drye | H02K 11/33 |
| | | | 310/89 |
| 2013/0106257 A1* | 5/2013 | Song | H02K 11/0073 |
| | | | 310/68 R |

* cited by examiner

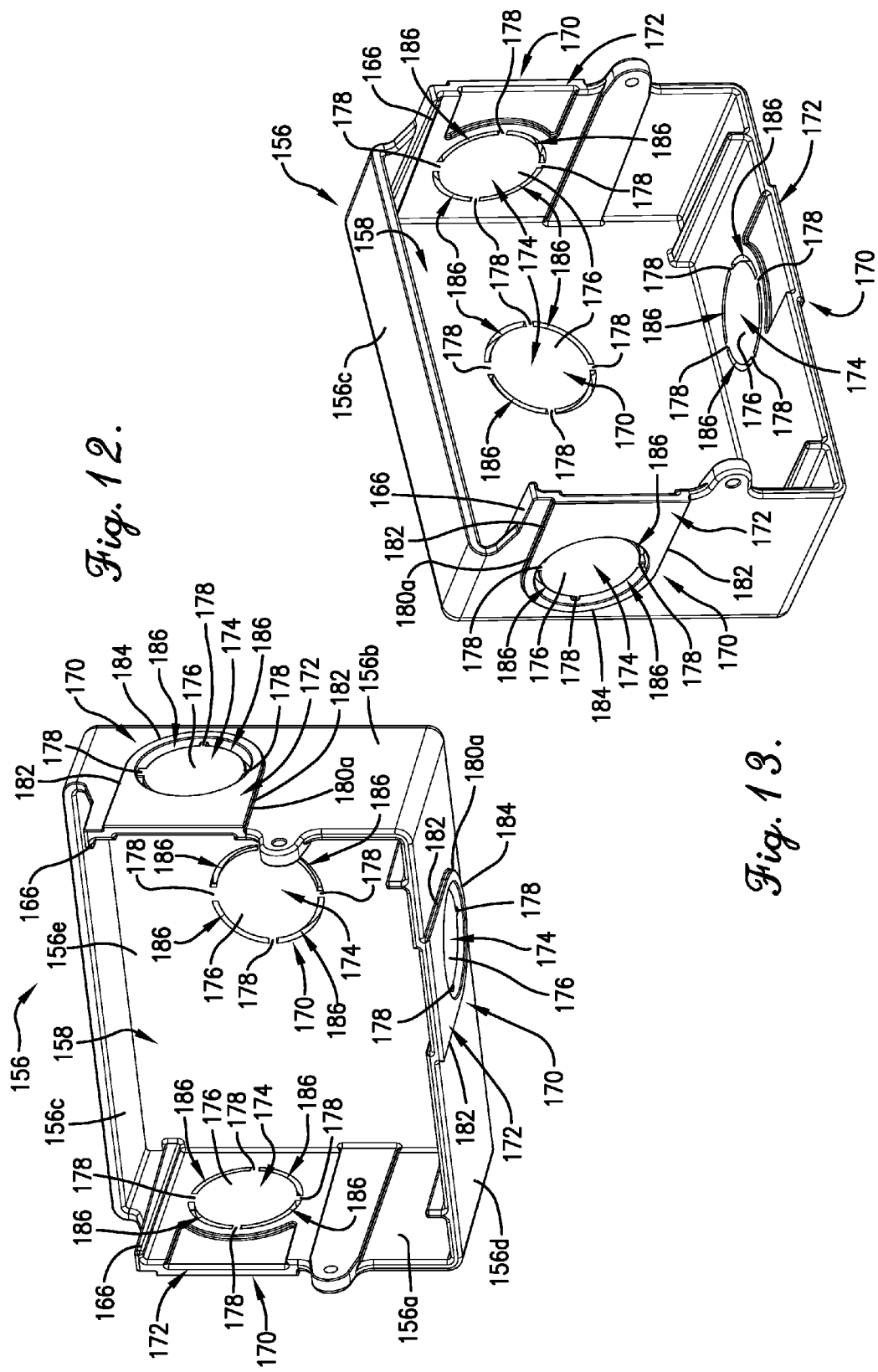

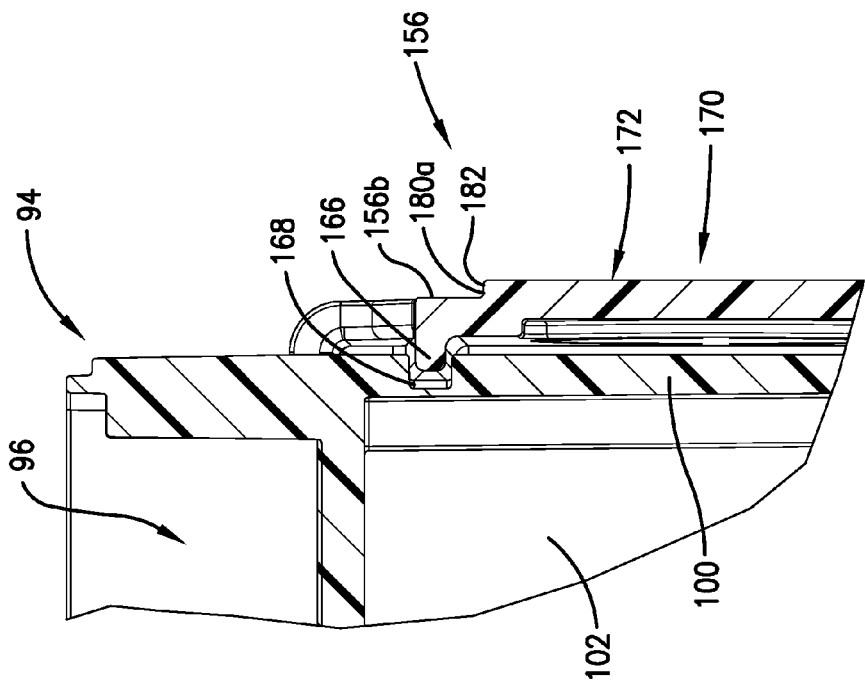
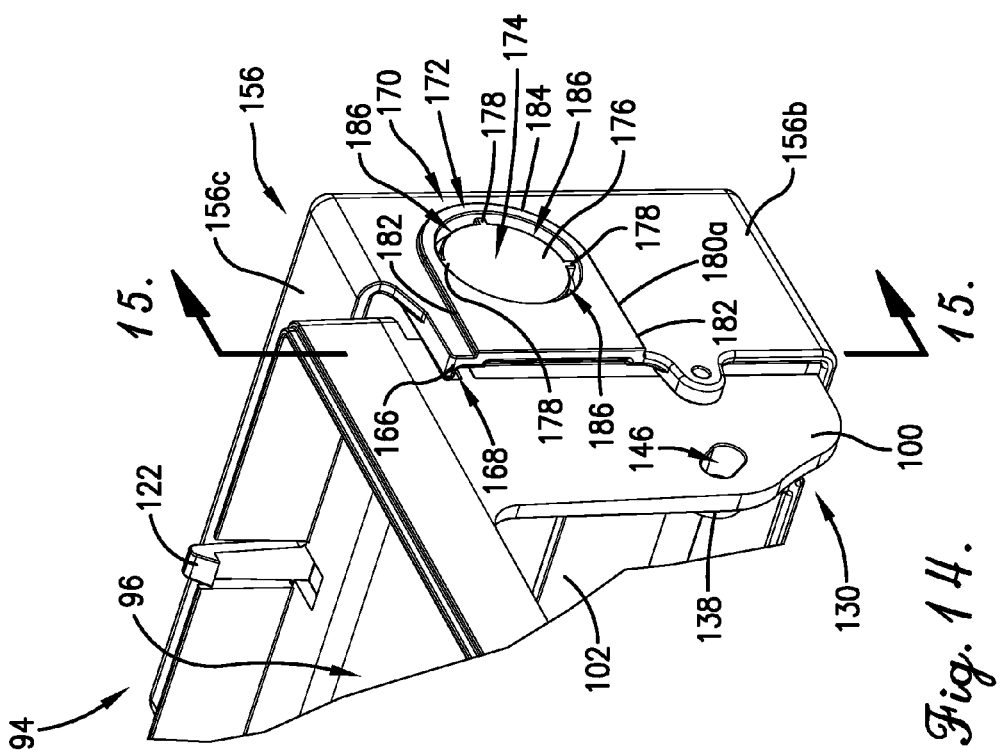

US 9,531,231 B2

RADIALLY OFFSET MOTOR CONTROL HOUSING

BACKGROUND OF THE INVENTION

1. Field of the Invention

The present invention relates generally to an electric motor having a controller housing defining an electronics compartment. More particularly, the present invention concerns a motor having a rotor, a stator, a shell at least partly circumscribing the rotor and the stator, and a controller housing positioned radially outside the shell.

2. Discussion of the Prior Art

Those of ordinary skill in the art will appreciate that electric motors are used in a variety of machines, including but not limited to blower motors for heating, ventilation, and/or air conditioning systems (HVAC systems). A controller, including a control board and a plurality of electronics components mounted to the board, may be provided to control the operation of the motor. The controller is conventionally mounted at one axial end of the motor.

SUMMARY

According to one aspect of the present invention, a motor is provided. The motor comprises a rotor, a stator, a motor shell, a pair of motor endshields, and a controller housing. The rotor is rotatable about an axis. The stator presents opposite axial ends. The motor shell extends around the axis to at least partly circumscribe the rotor and stator. Each motor endshield is positioned adjacent a respective one of the stator ends and provides support for the rotor. The fastener extends through and interconnects the stator and endshields. The controller housing defines an electronics compartment positioned radially outside the motor shell. The controller housing includes a connector that receives the fastener so as to fix the controller housing to the stator and endshields.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 12 is a bottom, side perspective view of the auxiliary controller housing of FIGS. 1-4;

FIG. 13 is a top, side perspective view of the auxiliary controller housing of FIG. 12;

FIG. 14 is a partially fragmented top, rear perspective view of a portion of the controller housing and the auxiliary controller housing of FIGS. 1-4;

FIG. 15 is a partially fragmented rear view taken along line 15-15 of FIG. 14.

Figure 1:
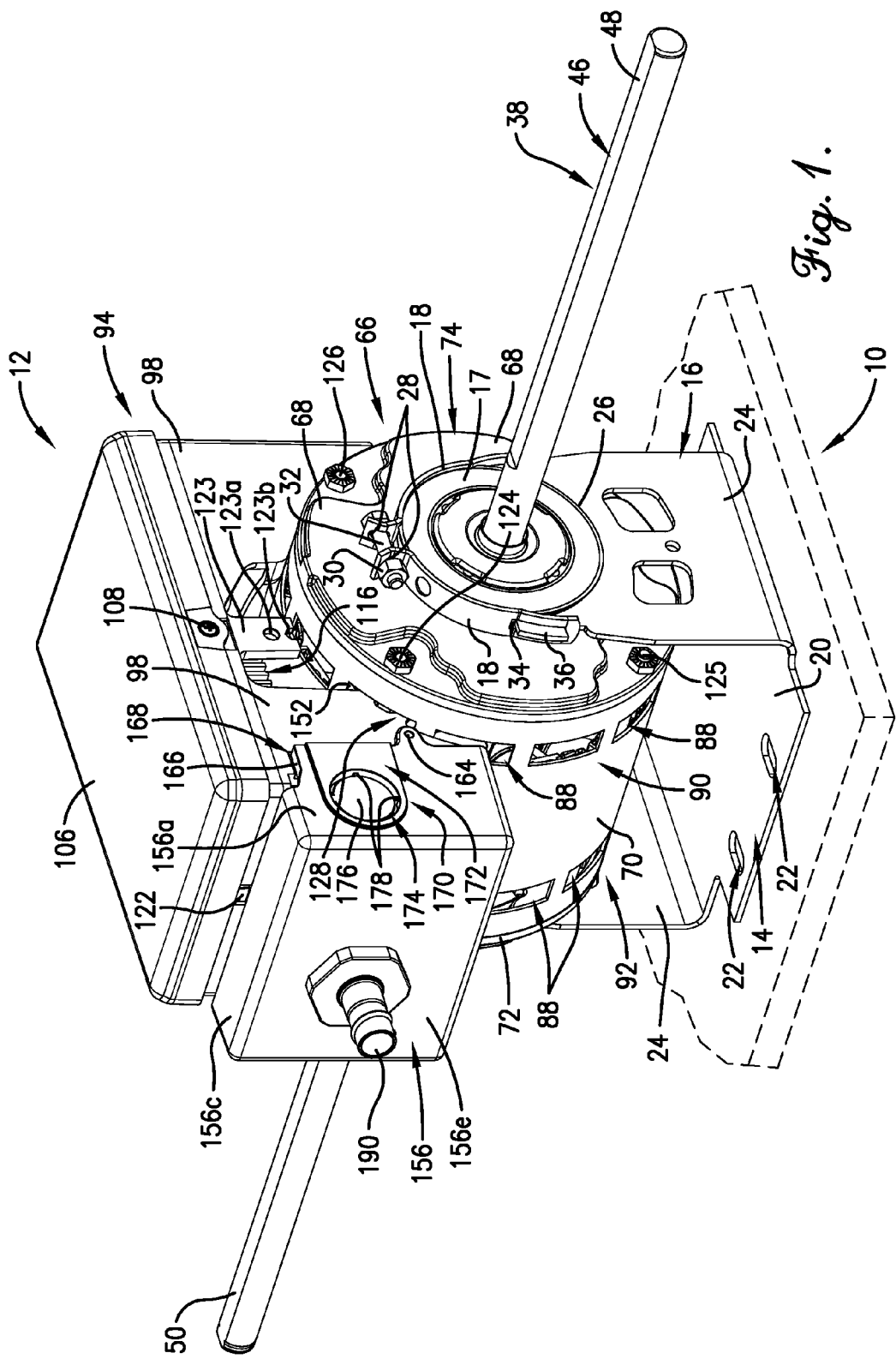
FIG. 1 is top, front perspective view of a machine constructed in accordance with a first preferred embodiment of the present invention, particularly illustrating the motor of the machine.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, a machine 10 is provided. The machine 10 is preferably a heating, ventilation, and/or air conditioning (HVAC) unit. Most preferably, the machine 10 is an air moving unit including a pair of blowers. However, it is permissible according to some aspects of the present invention for the machine to be any one of a variety of machines, including but not limited to an electric vehicle or an appliance such as a dishwasher or washing machine.

A motor 12 is mounted on the machine 10 via mounting structure 14. As best shown in FIGS. 1-4, mounting structure 14 preferably includes a frame 16, a pair of resiliently deformable bushings 17 (e.g., rubber rings), and two pairs of clamps 18 for securing the motor 12 to the frame 16. In a preferred embodiment, as illustrated, the frame 16 includes a base plate 20 defining plurality of mounting openings 22 that are configured to receive fasteners (not shown) for securing the frame 16 to the machine 10. The frame 16 also preferably includes a pair of spaced apart arms 24 projecting at least substantially perpendicularly from the base plate 20. Each arm 24 defines a curved cradle surface 26 that supports the motor 12.

The bushings 17 each preferably rest on a corresponding one of the cradle surfaces 26. The clamps 18 of each pair preferably each extend arcuately about the perimeter of the corresponding bushing 17 such that the bushing 17 is at least in part positioned between the clamps 18.

The clamps 18 each preferably define a fastener-receiving opening 28. The clamps 18 of each pair are preferably interconnected by a nut 30 and a bolt 32 such that the clamps 18 of each pair may be drawn closer to each other (and thus more tightly about the corresponding bushing 17) or allowed to move apart by screwing or unscrewing, respectively, of the nut 30. More particularly, the bolt 32 preferably extends through both of the fastener-receiving openings 28 of the given pair to interconnect the clamps 18 of that pair. It is permissible without departing from the scope of the present invention however, for belly band mounting or other mounting configurations to be used.

A slot 34 is preferably formed in each clamp 18, and a corresponding projection 36 is preferably formed on each arm 24. The projections 36 are received in the slots 34 when the motor 12 is secured on the frame 16.

The motor 12 may produce any amount of power without departing from the scope of some aspects of the present invention. However, it is preferable that the motor 12 generate less than one (1) horsepower (hp). Most preferably, the motor 12 is a one hundred twenty (120) mm diameter motor that generates about one fourth (¼) hp during normal operation.

The motor 12 is preferably a permanent magnet motor. However, it is within the ambit of the present invention for the motor to be any one of a variety of other motor types, such as a permanent split capacitor (PSC) motor.

Figure 3:
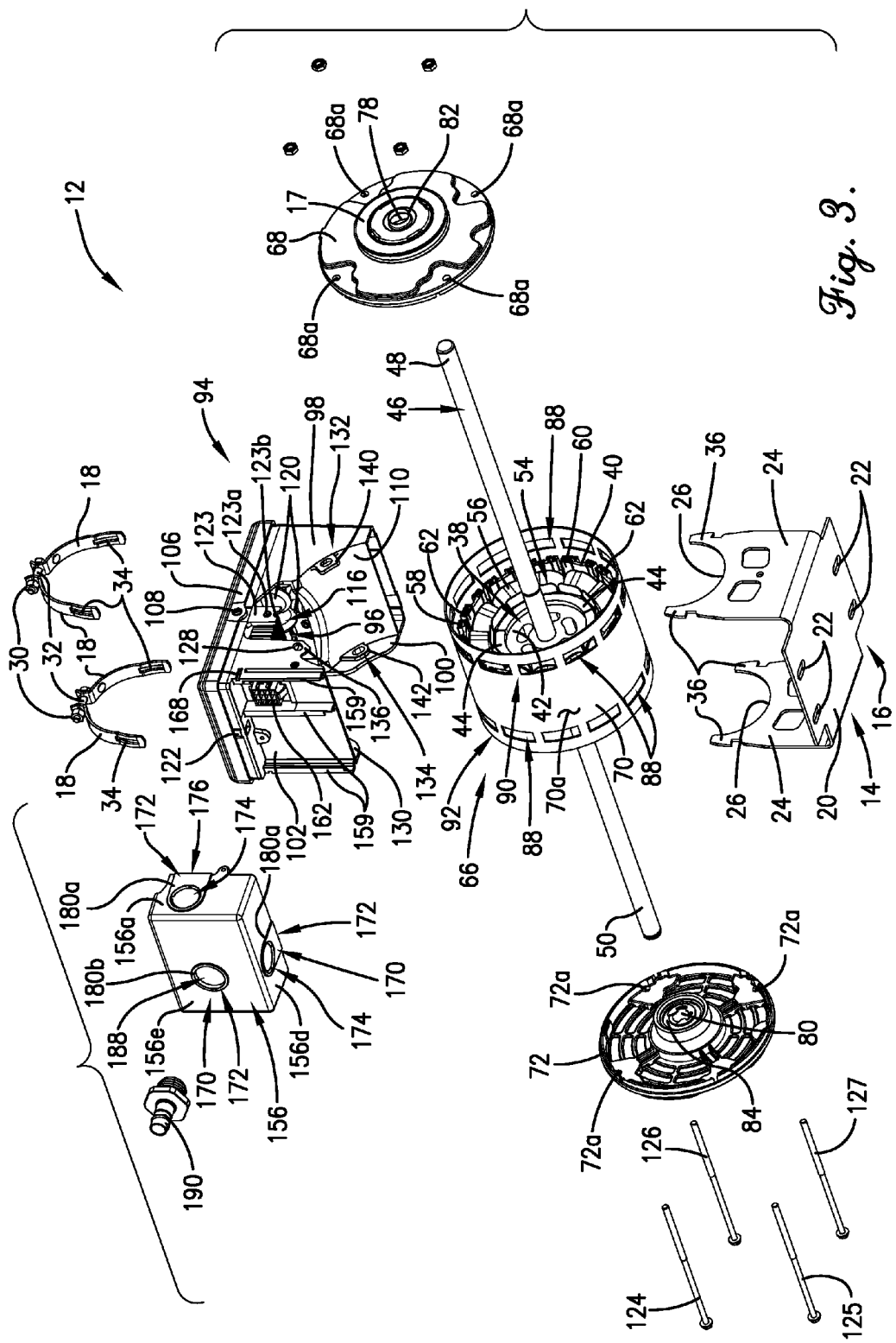
FIG. 3 is an exploded bottom, front perspective view of the motor of FIGS. 1 and 2.

The motor 12 preferably includes a rotor 38 rotatable about an axis and a stator 40. As best shown in FIG. 3, the stator 40 preferably at least substantially circumscribes the rotor 38, such that the motor 12 is an inner rotor motor. It is permissible according to some aspects of the present invention, however, for an outer rotor motor, a dual rotor motor, or an otherwise alternatively configured motor to be used.

The rotor 38 preferably includes a rotor core 42, a plurality a plurality of magnets 44 arcuately arranged about the outer perimeter of the rotor core 42, and a shaft 46. However, alternative rotor arrangements are permissible. For instance, magnets might be spaced about the inner perimeter of the rotor core or about both perimeters.

The rotor 38 is preferably rotatable about an axis at least in part defined by the shaft 46. However, an alternative rotation axis is permissible according to the present invention. For instance, the rotation axis might at least in part be parallel to but spaced from the shaft.

The shaft 46 preferably includes a first end 48 extending axially beyond the frame 16 in a first axial direction and a second end 50 extending axially beyond the frame 16 in a second axial direction at least substantially opposite the first axial direction. The shaft ends 48 and 50 may be used to drive machine components or external mechanisms as suitable for a given application. In a preferred embodiment, for instance, each shaft end 48,50 drives a blower (not shown) of an air moving unit (e.g., a blower wheel may be fixedly mounted to each shaft end 48 or 50). Those of ordinary skill in the art will appreciate that the illustrated motor 12 is a so-called "double shaft" motor. Although the principles of the present invention are equally applicable to a "single shaft" motor, the provision of shaft ends projecting from each end of the motor prevents the motor control from being placed at one end of the motor, as is conventional.

The stator 16 preferably includes a stator core 52 and a plurality of coils 54 wound about the stator core 52. The coils 54 are preferably formed from electrical wiring 56. The wiring may be formed of any one or more of a variety of electrically conductive materials, including but not limited to copper and aluminum.

The stator 40 also preferably includes insulative structures 58. However, it is within the scope of the present invention for alternatively configured insulation or even no insulation to be provided. For instance, the stator core 52 might alternatively be provided with electrically insulative powder-coating.

The insulative structures 58 preferably have axially outermost ends 60 that cooperatively at least in part define axial ends 62 and 64 of the stator 40. Each axial end 62,64 of the stator 40 is substantially flat, in the sense that it is defined based on structures (in particular, the axially outermost ends 60 of the insulative structures 58) that extend generally along a plane that is perpendicular to the rotor 38 axis.

The motor 12 further preferably includes a motor case 66 broadly including a first endshield 68, a shell 70, and a second endshield 72. The stator 40 is preferably positioned axially between the first and second endshields 68 and 72 such that the endshields 68 and 72 are positioned adjacent respective ones of the stator ends 62 and 64. The shell 70 is preferably likewise positioned axially between the first and second endshields 68 and 72. According to some aspects of the present invention, the shell 70 may alternatively extend axially beyond either or both of the endshields 68 and/or 72.

More particularly, the shell 70 preferably extends generally circumferentially about the axis so as to present a curved outer surface 70*a* and to at least in part circumscribe the stator 40 and the rotor core 42 and magnets 44. The first and second endshields 68 and 72 are preferably press fit or otherwise secured (e.g., by use of latches, fasteners, and/or adhesives) to the shell 70.

The endshields 68 and 72 thereby preferably define first and second axial margins 74 and 76 of the motor 12.

The endshields 68 and 72 preferably provide support for the rotor 38. More particularly, each endshield 68 and 72 preferably defines a respective shaft opening 78 or 80. The ends 48 and 50 of the shaft 46 preferably extend past corresponding ones of the axial ends 62 and 64 of the stator 40, through respective ones of the openings 78 and 80, and thereby past the first and second axial margins 74 and 76 of the motor 12. The shaft 46 preferably is rotatably supported in the endshields 68 and 72 by respective bearing assemblies 82 and 84. The bearing assemblies 82 and 84 may be of any type suited to the particular application. For instance, the bearing assemblies might comprise bushings or ball bearings.

Preferably, the shell 70 extends continuously and fully circumferentially about the stator 40 in solid form with the exception of a notch 86 (to be described in more detail below) and a plurality of ventilation openings 88 formed therein. The endshields 68 and 72 are likewise at least substantially solid in construction, with the exception of the aforementioned shaft openings 78 and 80. Passage of contaminants through the shell 70 and/or the endshields 68 and 72 to the stator 40 and rotor core 42 and magnets 44 is thereby at least substantially restricted. It is permissible according to some aspects of the present invention, however, for additional openings to be formed in the shell and/or endshields for any one or more of a variety of purposes, including but not limited to heat dispersion, ventilation, and user access. Furthermore, partial extension and/or discontinuous extension of the shell is permissible according to some aspects of the present invention The ventilation openings 88 are preferable formed into a first set 90 and a second set 92 axially spaced apart from the first set 90. The ventilation openings 88 in each set 90,92 are preferably arcuately arranged and circumferentially spaced apart.

Figure 8:
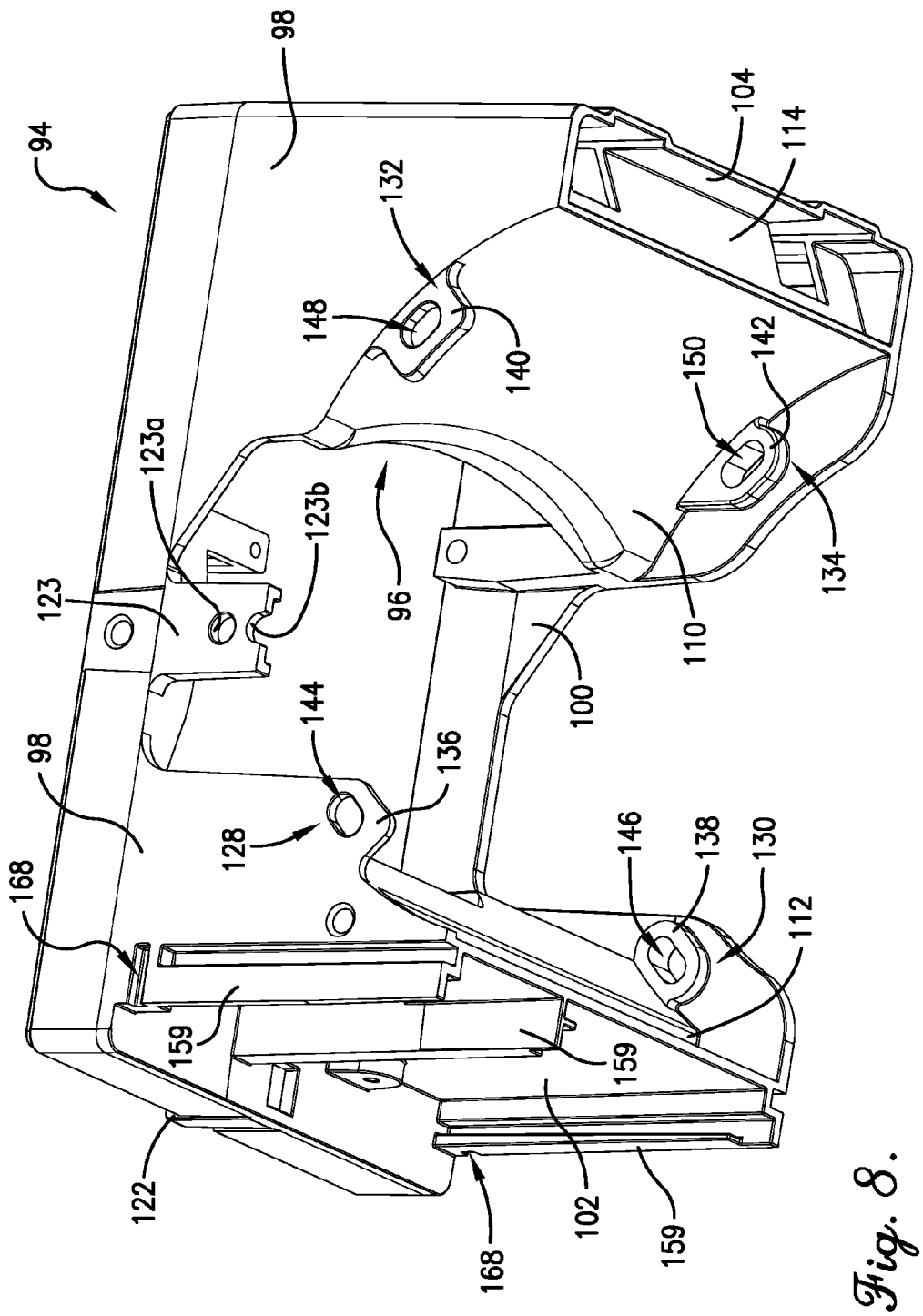
FIG. 8 is a bottom, front perspective view of the controller housing of FIGS. 1-7.
Figure 9:
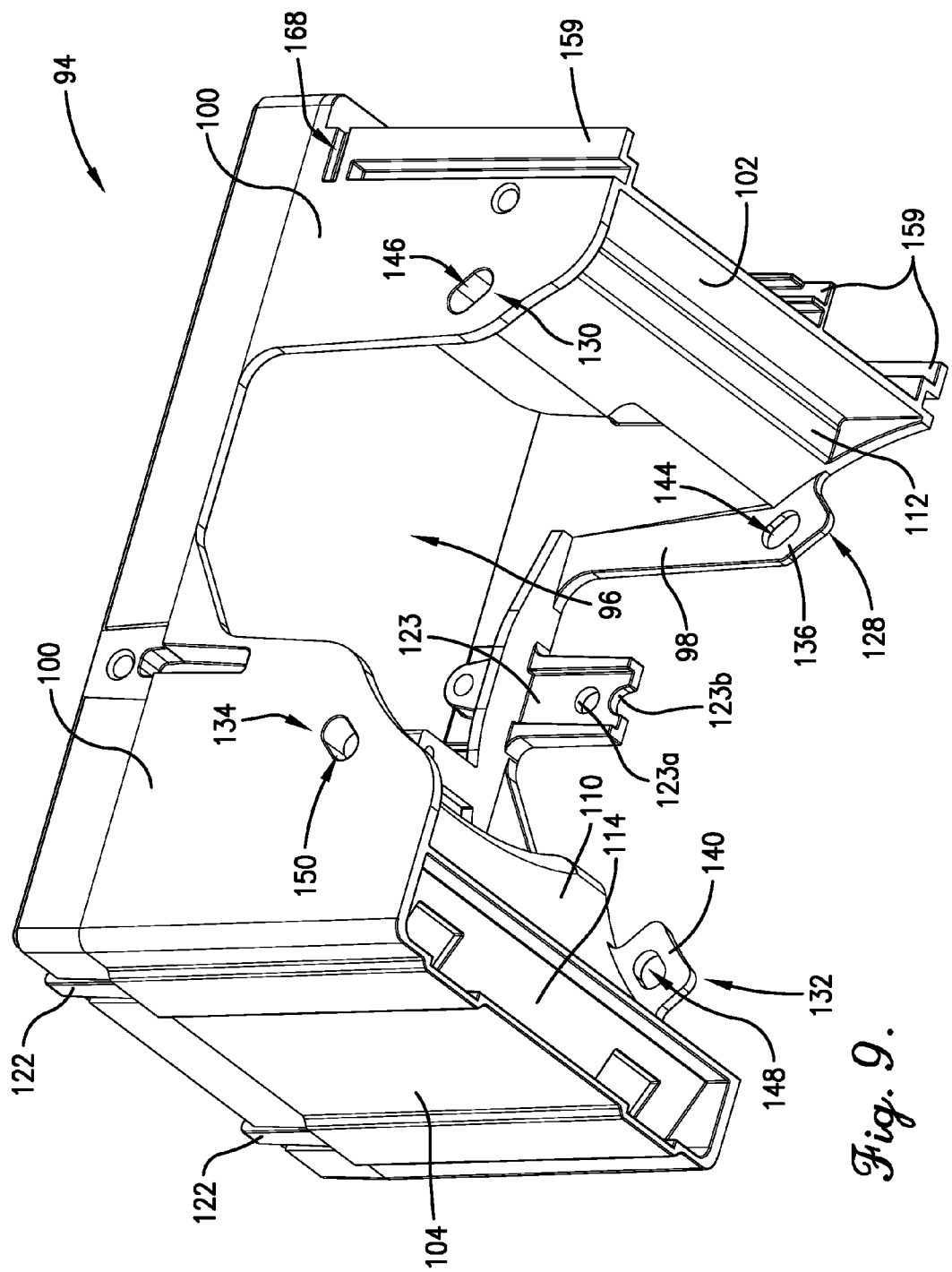
FIG. 9 is a bottom, rear perspective view of the controller housing of FIG. 8.
Figure 10:
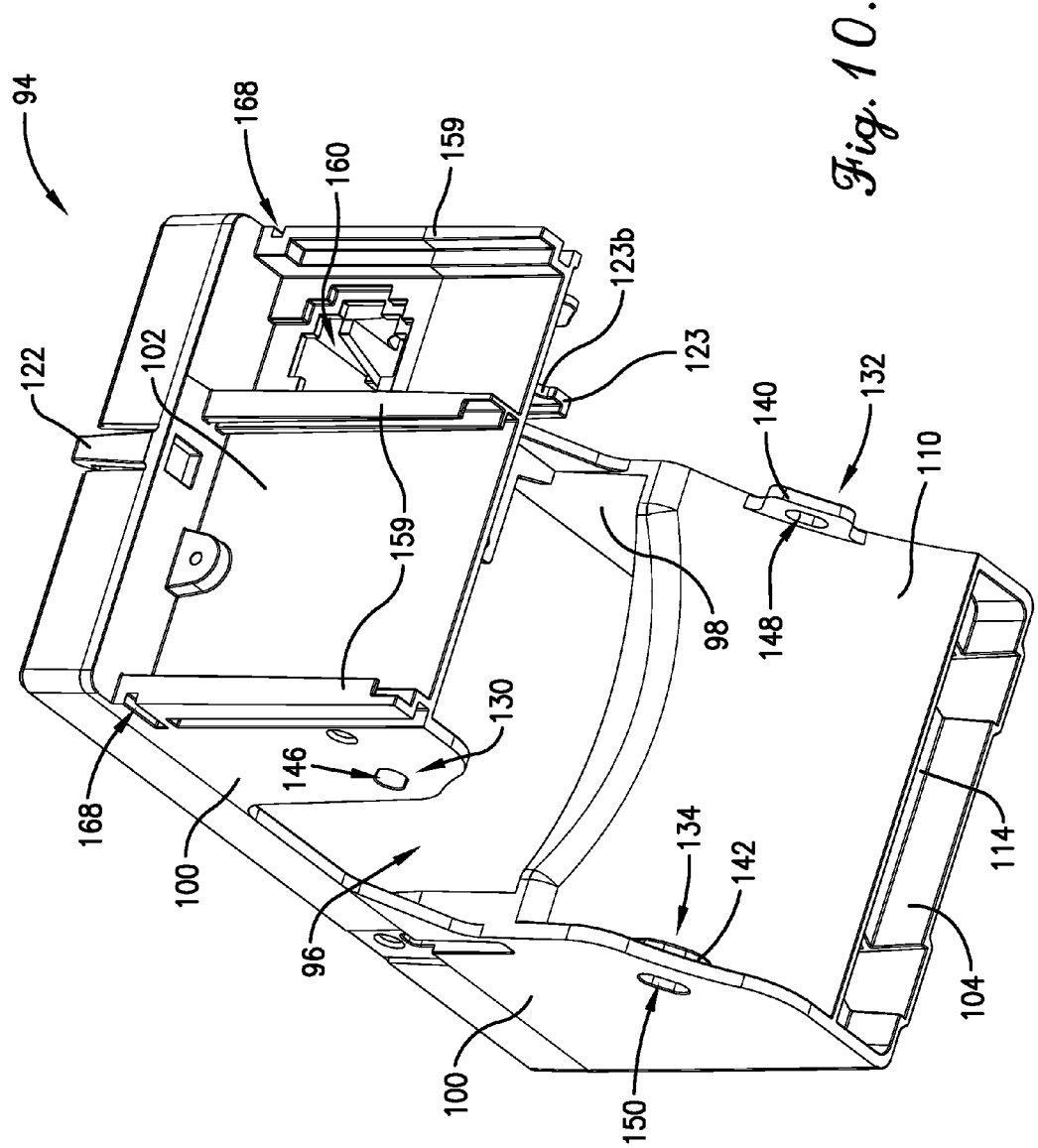
FIG. 10 is a bottom, side perspective view of the controller housing of FIGS. 8 and 9.

The motor 12 preferably further includes a radially offset controller housing 94 that defines an at least substantially enclosed electronics compartment 96 positioned radially outside the motor shell 70. More particularly, the controller housing 94 preferably includes a front wall 98, a rear wall 100, and a pair of side walls 102 and 104. The controller housing 94 preferably further includes a lid or cover 106 that is securable to the front and rear walls 98 and 100 via screws 108 and/or other suitable fastening means. Yet further, as best shown in FIGS. 8-10, the controller housing 94 preferably further includes a first bottom wall 110, a second bottom wall 112, and a third bottom wall 114.

The first bottom wall 110 is preferably curved and overlies the curved outer surface 70a of the motor shell 70. Most preferably, the outer surface 70a and the curved first bottom wall 110 have at least substantially similar radiuses of curvature and engage each other.

Figure 11:
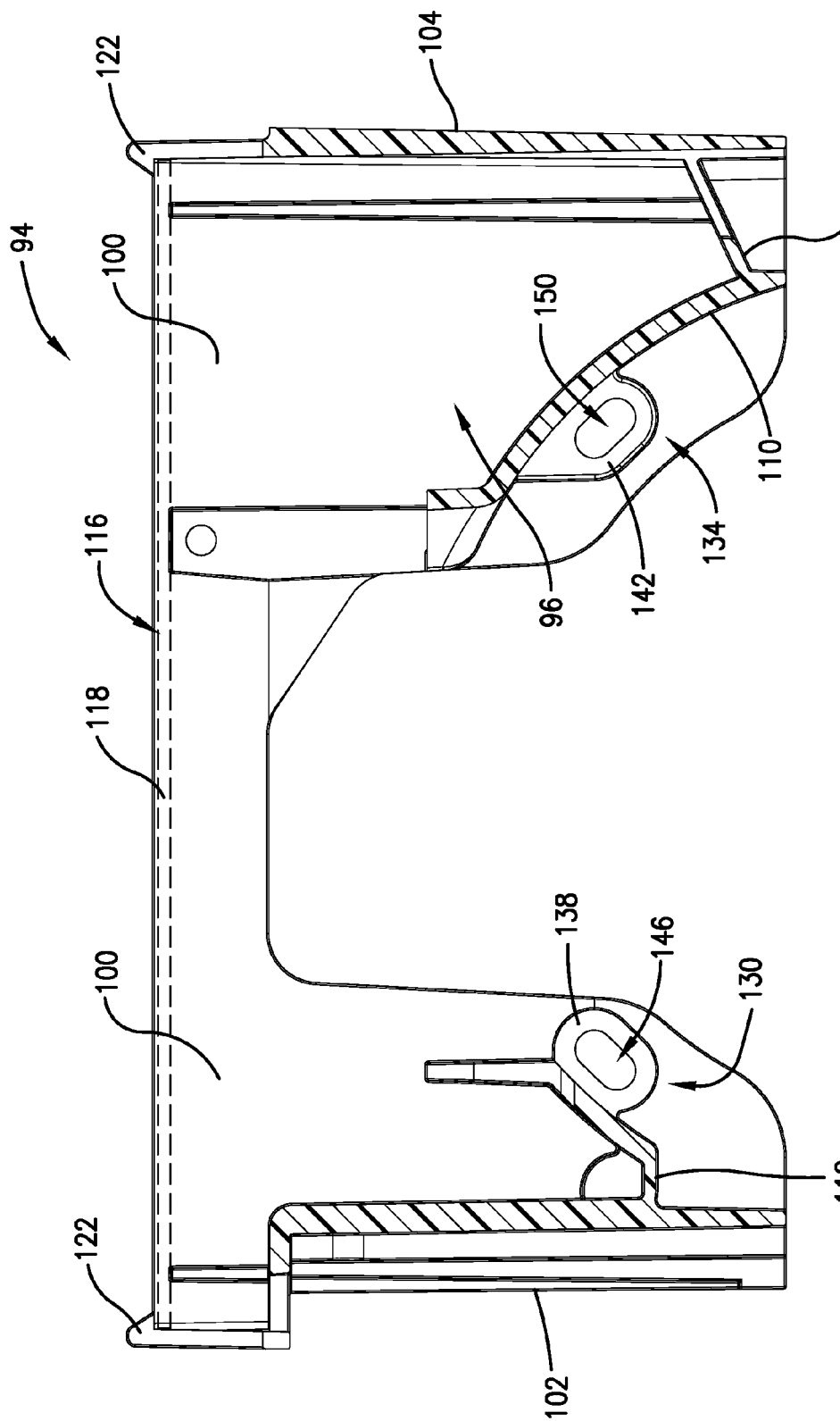
FIG. 11 is a front cross-sectional view of the controller housing of FIGS. 8-10, particularly illustrating the latching of the control board on the housing.

A controller 116, preferably including a board 118 (e.g., a printed circuit board) and a plurality of electronic components 120 fixed to the board 118, is preferably mounted on the controller housing 94 such that the board 118 and the electronic components 120 are received in the electronics compartment 96. More particularly, as best shown in FIG. 11, the controller housing 94 preferably includes a plurality of latches 122 securing the controller 116 to the controller housing 94. Alternative attachment means are permissible within the scope of some aspects of the present invention, however.

The notch 86 formed in the shell 70 preferably enables the interconnection of wires from the stator 40 to the controller 116.

The controller housing 94 also preferably includes a wire management tab 123 extending generally radially toward the shell 70. The wire management tab 123 preferably defines a wire management opening 123a and a wire management notch 123. The wire management tab 123 preferably enables the management of wires associated with the controller 116.

In a preferred embodiment, the electronics components 120 are potted in the cover 106. Such an approach aids in resistance to shock and vibration and also protects the components from moisture and other contaminants.

Preferably, the controller housing 94 is at least substantially solid in construction such that passage of contaminants thereinto is restricted. In one preferred embodiment, however, ventilation holes (not shown) may be provided in the cover or lid. (If necessary, such ventilation holes can be covered with a label or other covering prior to potting, assuming ventilation is not desired.)

In a preferred embodiment, the controller housing 94 comprises plastic. Such a material choice is particularly suited for the preferred embodiment of the present invention, in which the motor is a low horsepower motor generating only a small amount of heat and thereby not requiring provision of a highly efficient heat sink. It is permissible according to some aspects of the present invention, however, for another suitable material or materials (e.g., metal) to be used.

The motor 12 preferably includes four (4) fasteners 124,125,126,127 extending through and interconnecting the core 52 of the stator 40 and the endshields 68 and 72. More particularly, the fasteners 124,125,126,127 preferably extend through corresponding fastener-receiving openings 68a in the first endshield 68, fastener-receiving openings 52a in the stator core 52a, and fastener-receiving openings 72a in the second endshield 72.

The fasteners are preferably evenly arcuately spaced apart so as to be spaced apart by about ninety (90) degrees. It is permissible according to some aspects of the invention, however, for more or fewer fasteners to be provided and/or for them to be alternately arranged.

Furthermore, the controller housing 94 preferably includes a first pair of connectors 128 and 130 corresponding to the fastener 124 and a second pair of connectors 132 and 134 corresponding to the fastener 126.

The connector 128 preferably comprises a tab 136 extending generally radially from the front wall 98. The connector 130 preferably includes both a portion of the rear wall 100 and also a boss 138 projecting generally axially from the rear wall 100. Similarly to the connector 128, the connector 132 preferably comprises a tab 140 extending generally radially from the front wall 98. Similarly to the connector 130, the connector 134 preferably includes both a portion of the rear wall 100 and also a boss 142 projecting generally axially from the rear wall 100.

The tab 136 of the connector 128 preferably defines a fastener-receiving opening 144 therethrough. The boss 138 and the portion of the rear wall 100 forming the connector 130 preferably cooperatively define a fastener-receiving opening 146 therethrough. The tab 140 of the connector 132 preferably defines a fastener-receiving opening 148 therethrough. The boss 142 and the portion of the rear wall 100 forming the connector 134 preferably cooperatively define a fastener-receiving opening 150 therethrough.

The connectors 128 and 130 of the first pair are preferably axially spaced apart, with the corresponding fastener-receiving openings 144 and 146 preferably being at least substantially radially and angularly aligned. (Radial and angular alignment as used herein means that the openings are at the same radial distance from the axis and are also at the same angular position.) The connectors 132 and 134 of the second pair are also preferably axially spaced apart, with the corresponding fastener-receiving openings 148 and 150 also preferably being at least substantially radially and angularly aligned.

The connectors 128 and 130 of the first pair preferably cooperatively receive the fastener 124, while the connectors 132 and 134 of the second pair preferably cooperatively receive the fastener 126. More particularly, the fastener 124 preferably extends through the fastener-receiving openings 144 and 146 of the first pair of connectors 128 and 130, while the fastener 126 preferably extends through the fastener-receiving openings 148 and 150 of the second pair of connectors 132 and 134. Each fastener 124,126 thus extends through and interconnects the first and second endshields 68 and 72, the stator 40 (more particularly, the stator core 52), and the controller housing 94. As noted previously, the fasteners 125 and 127 extend through and interconnect the first and second endshields 68 and 72 and the stator 40 (more particularly, the stator core 52) but not the controller housing 94.

The aforementioned radial and angular alignment of the fastener-receiving openings 144,146 and 148,150 enables the use of fasteners 124,125,126,127 that extend linearly (i.e., are straight), as illustrated. However, principles of the present invention also encompass fasteners that have axially offset sections and/or are curvilinear, such that the fastener-receiving openings may not be angularly and/or radially aligned.

Figure 5:
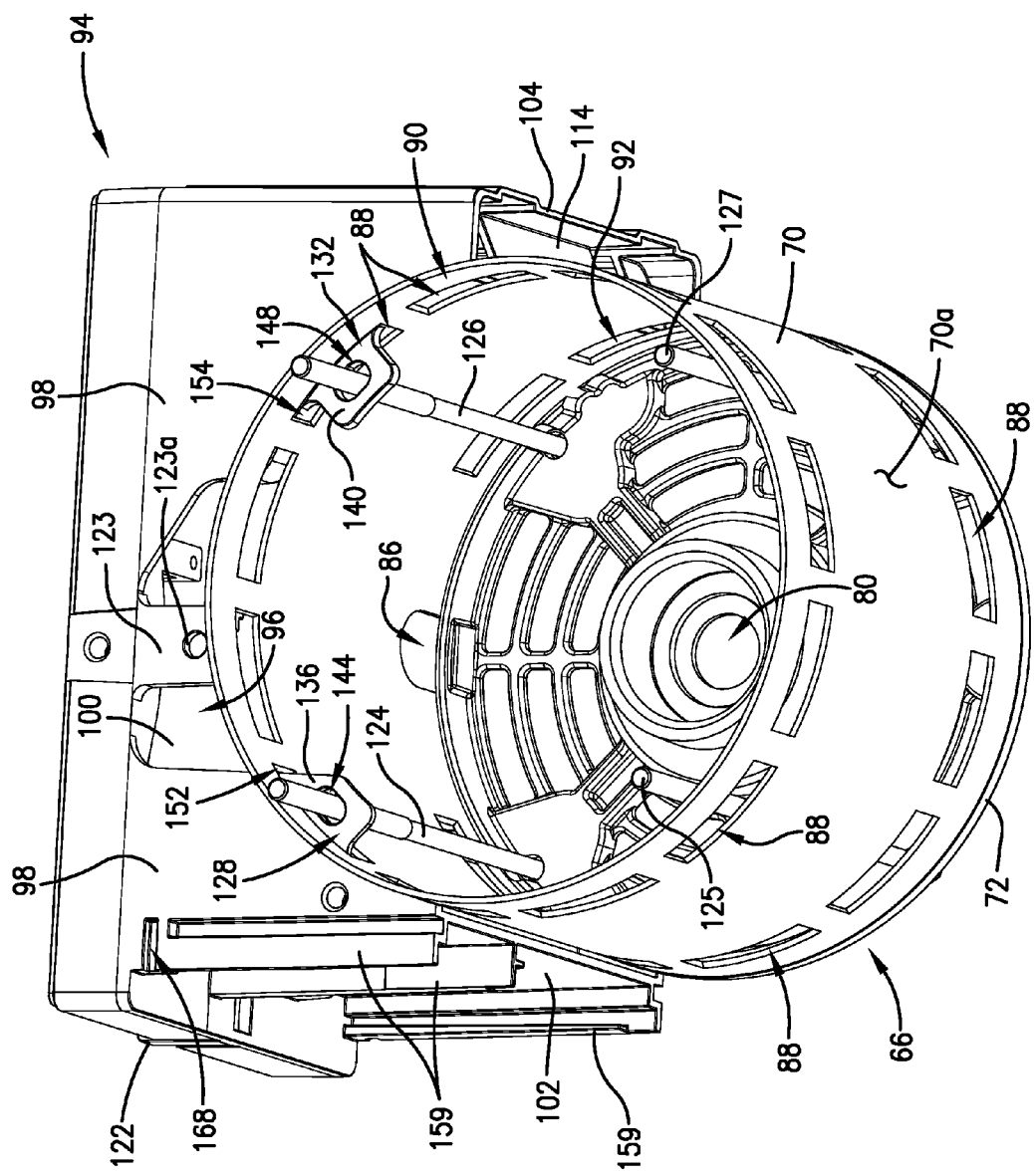
FIG. 5 is a bottom, front perspective view of the controller housing, shell, connectors, and fasteners of the motor of FIGS. 1-4.
Figure 6:
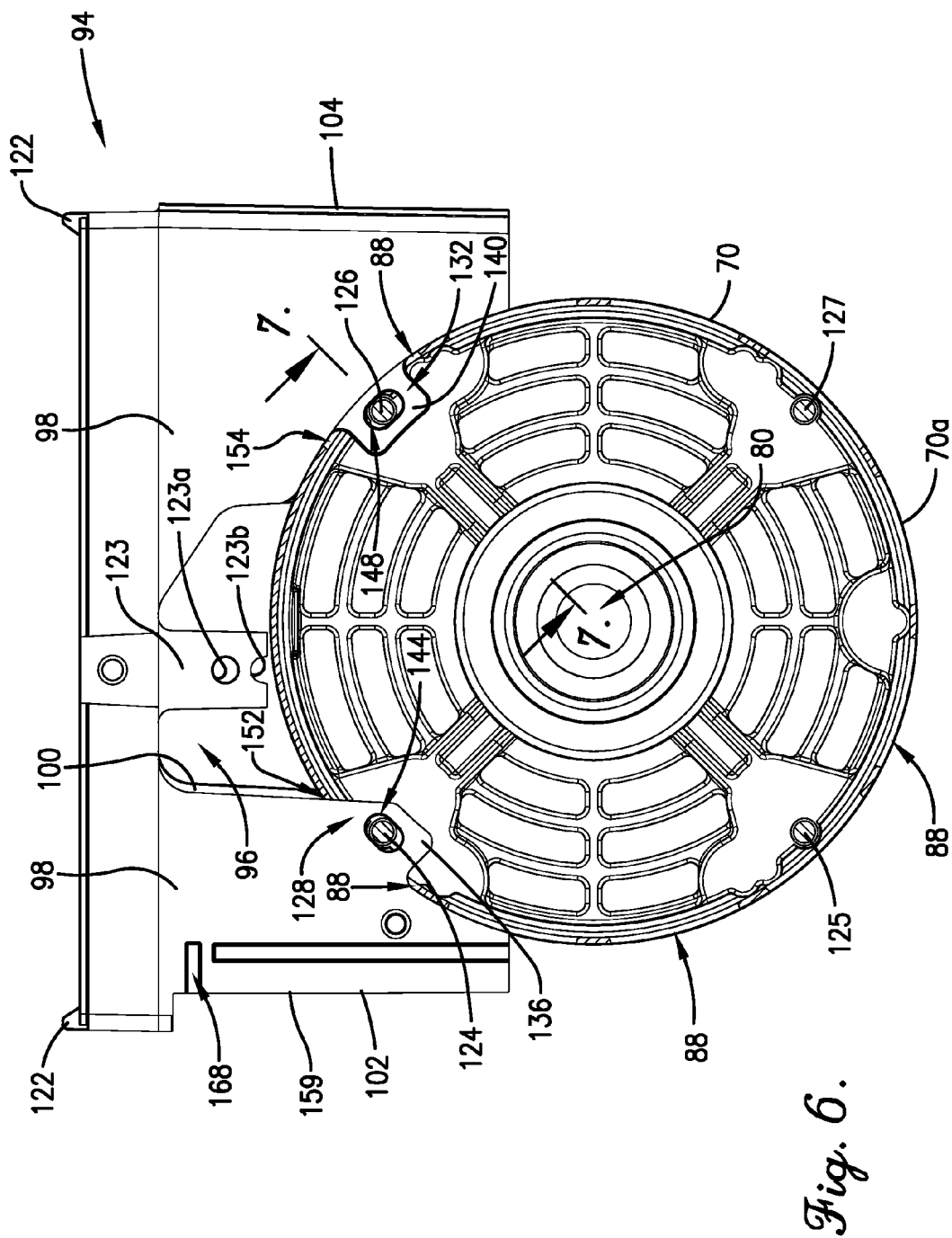
FIG. 6 is a cross-sectional front view of the controller housing, shell, connectors, and fasteners of FIG. 5.
Figure 7:
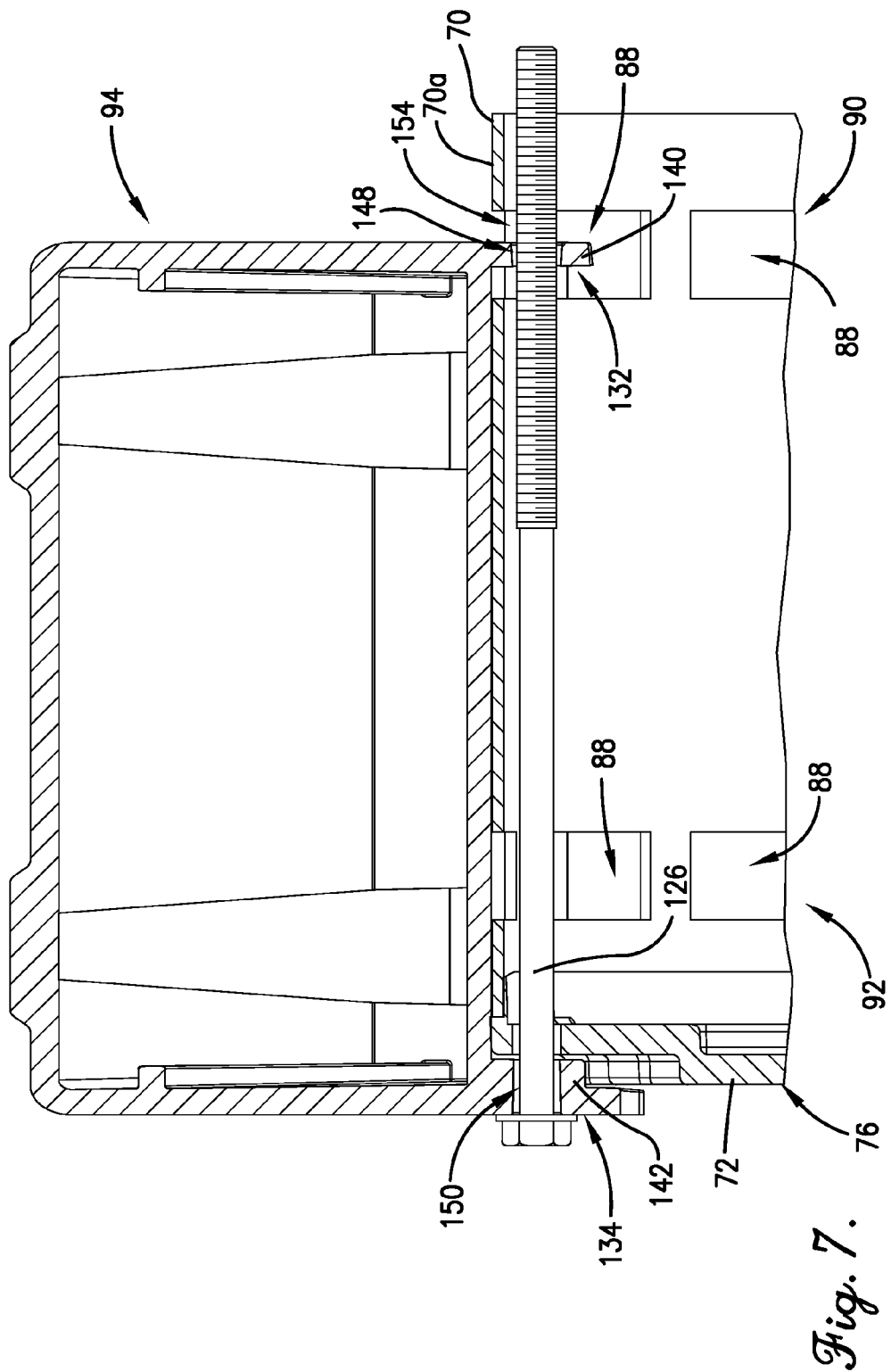
FIG. 7 is a partially fragmented cross-sectional view taken along line 7-7 of FIG. 6, particularly illustrating the extension of a connector through a connector-receiving opening in the shell.

As shown in FIGS. 5 and 7, the fasteners 124,125,126,127 are preferably threaded. More particularly, the fasteners 124, 125,126,127 are preferably nut and bolt combinations, although a variety of fastener types may be suitably employed without departing from the spirit of the present invention.

In a preferred embodiment, a pair of the previously described ventilation openings 88 of the first set 90 additionally act as connector-receiving openings 152 and 154. More particularly, as best shown in FIG. 5, the connector 128 preferably extends generally radially through the connector-receiving opening 152, while the connector 132 preferably extends generally radially through the connector-receiving opening 154. The fastener-receiving openings 144 and 148 and, in turn, the fasteners 124 and 126, are thus positioned at least in part radially inside the motor shell 70.

Although the fastener-receiving openings 144,146,148, 150 may have any shape and/or size and may vary in shape and/or size relative to each other, it is preferred that they have uniform, at least substantially oval cross-sections.

It is also permissible for the connectors 128,130,132,134 to vary in shape and/or size relative to each other.

Figure 2:
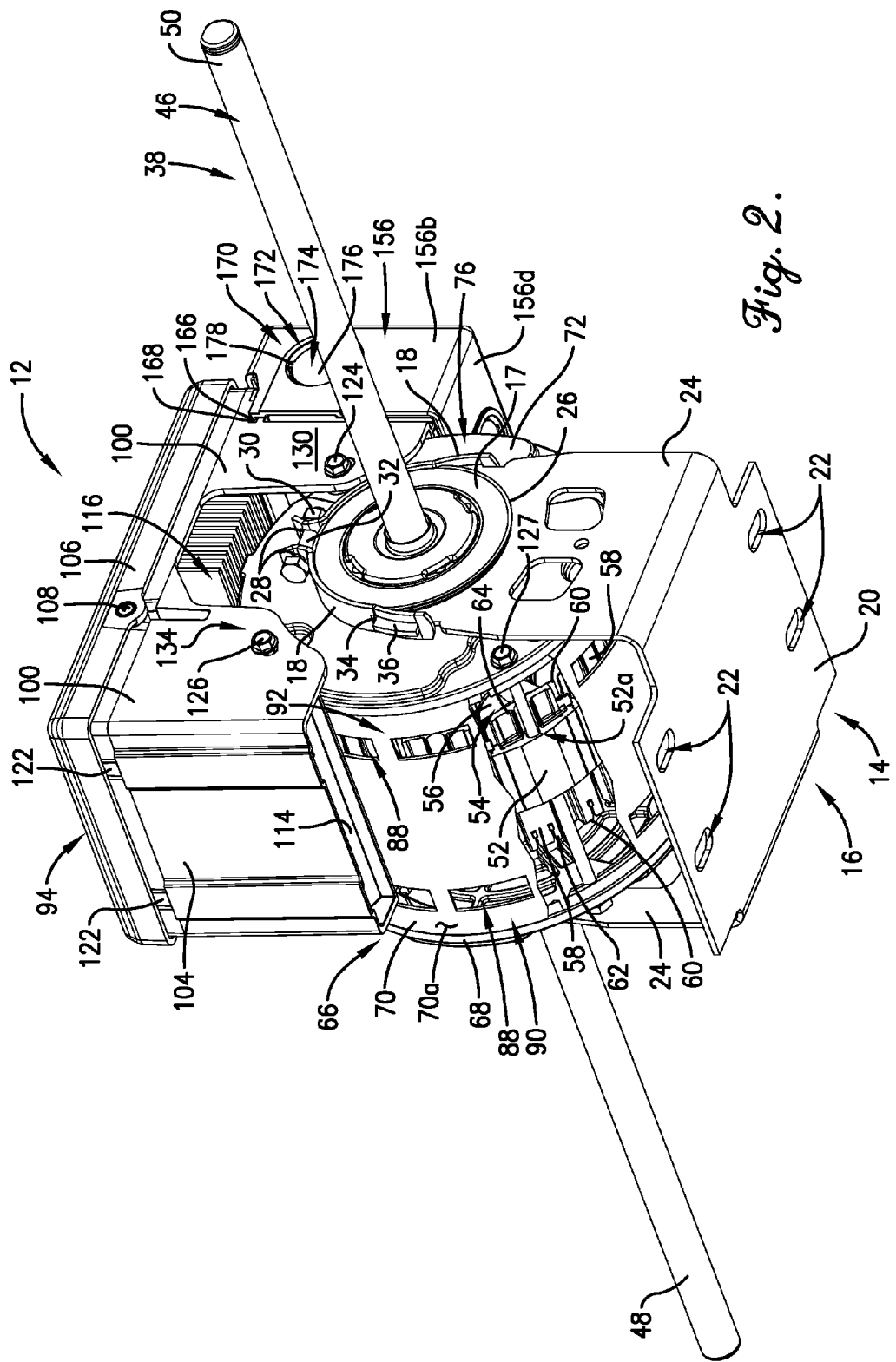
FIG. 2 is a bottom, rear perspective view of the motor of FIG. 1.

The connectors 130 and 134 preferably additionally position the controller housing 94 relative to the motor case 66 by interfacing with the second endshield 72. More particularly, as best shown in FIGS. 2 and 7, a portion of each of the connectors 130 and 134 abuts or very nearly abuts the second endshield 72 to at least substantially restrict axial shifting of the controller housing 94 relative to the motor case 66 in one axial direction.

Preferably, the controller housing 94 is positioned entirely between the first and second axial margins 74 and 76 of the motor 12. Such positioning is highly advantageous. Among other things, for instance, such positioning enables the motor 12 to be installed in spaces having only a small axial envelope and allows unobstructed access to both ends 48 and 50 of the shaft 46. These installation and access advantages may be particularly advantageous in retrofitting applications.

In a preferred embodiment, the motor 12 further includes an auxiliary controller housing 156 fixed to the controller housing 94. The auxiliary controller housing 156 preferably at least in part defines an auxiliary electronics compartment 158 positioned radially outside the motor shell 70.

An auxiliary controller such as a second printed circuit board may suitably be received in the auxiliary controller housing. More particularly, the auxiliary controller may be slid onto support structures 159 provided on the controller housing 94.

The auxiliary controller housing 156 is preferably entirely removable and may be omitted without departing from the scope of some aspects of the present invention.

The controller housing 94 preferably defines an aperture 160 interconnecting the electronics compartment 96 of the controller housing 94 and the auxiliary electronics compartment 158 of the auxiliary controller housing 156. As best shown in FIG. 3, a connecting element 162 may also be provided therebetween.

The auxiliary controller housing 156 is preferably secured to the controller housing 94 via a pair of screws 164 and, as best shown in FIG. 15 and others, a pair of projections 166 received in complementary recesses 168 formed in the controller housing 94.

A plurality of conduit connector assemblies 170 are preferably provided in the auxiliary controller housing 156. More particularly, the auxiliary controller housing 156 preferably includes a front wall 156a, a rear wall 156b, a top wall 156c, a bottom wall 156d, and a side wall 156e. The walls 156a, 156b, 156c, 156d, and 156e are preferably non-coplanar. Most preferably, the walls 156a, 156b, 156c, 156d, and 156e intersect generally orthogonally to form five (5) sides of a generally cuboidal shape. Alternate shapes are permissible without departing from the scope of the present invention, however.

Each conduit connector assembly 170 is preferably associated with a different one of the walls 156a, 156b, 156c, 156d, and 156e such that the conduit connector assemblies 170 are oriented in different directions. More particularly, in a preferred embodiment, as illustrated, respective conduit connector assemblies 170 are associated with each of the front, rear, bottom, and side walls 156a, 156b, 156d, and 156e. It is within the scope of the present invention, however, for more or fewer conduit connector assemblies to be provided and to be associated with any combination of the walls or even a single wall. For instance, only a single conduit connector assembly or none at all might be provided, or multiple conduit connector assemblies might be associated with a single wall. Each wall might be associated with a respective conduit connector assembly, as well, or a different set of walls than shown in the preferred illustrated embodiment might be associated with respective conduit connector assemblies.

The conduit connector assemblies 170 each preferably include a reinforcing boss 172 projecting generally orthogonally from the corresponding wall 156a,156b,156d,156e. Each conduit connector assembly 170 furthermore preferably includes a knockout portion 174 positioned adjacent the corresponding boss 172.

Each knockout portion 174 preferably comprises a disk 176 supported by at least one rib 178 and positioned adjacent the corresponding boss 172.

Each disk 176 is preferably circular in cross-section, although other shapes are permissible without departing from the scope of the present invention. The disks 176 are preferably each of the same shape and size, although shape and/or size variations fall within the scope of the present invention.

Preferably, each disk 176 is at least substantially co-planar with the respective one of the walls 156a,156b,156d,156e. Each disk 176 is therefore preferably recessed relative to the respective reinforcing boss 172.

Preferably, a plurality of the ribs 178 are provided to support each disk 176. Most preferably, four (4) ribs 178 are provided. Yet further, it is preferred that the ribs 178 are evenly arcuately spaced apart. Uneven spacing and/or non-arcuate arrangements are permissible, however, according to some aspects of the present invention.

The ribs 178 are preferably at least substantially co-planar with corresponding ones of the disks 176.

Each reinforcing boss 172 preferably defines an outer perimeter 180a or 180b. As shown, the outer perimeters 180a of the bosses 172 associated with the front, rear, and bottom walls 156a, 156b, and 156d, respectively, preferably each include a pair of spaced apart straight sides 182 and a semi-circular top 184 extending between and interconnecting the sides 182. In contrast, the outer perimeter 180b of the boss 172 associated with the side wall 156e is preferably circular in shape. Alternative shapes are permissible according some aspects of the present invention, however.

In a preferred embodiment, each reinforcing boss 172, the corresponding wall 156a,156b,156d,156e, and the corresponding knockout portion 174 (including the corresponding disk 176 and the corresponding ribs 178) cooperatively define a plurality of slits 186 in communication with the auxiliary electronics compartment 158. In a preferred embodiment, the slits 186 are generally arcuate in cross-sectional shape. However, alternative slit shapes are permissible without departing from the scope of the present invention.

Figure 4:
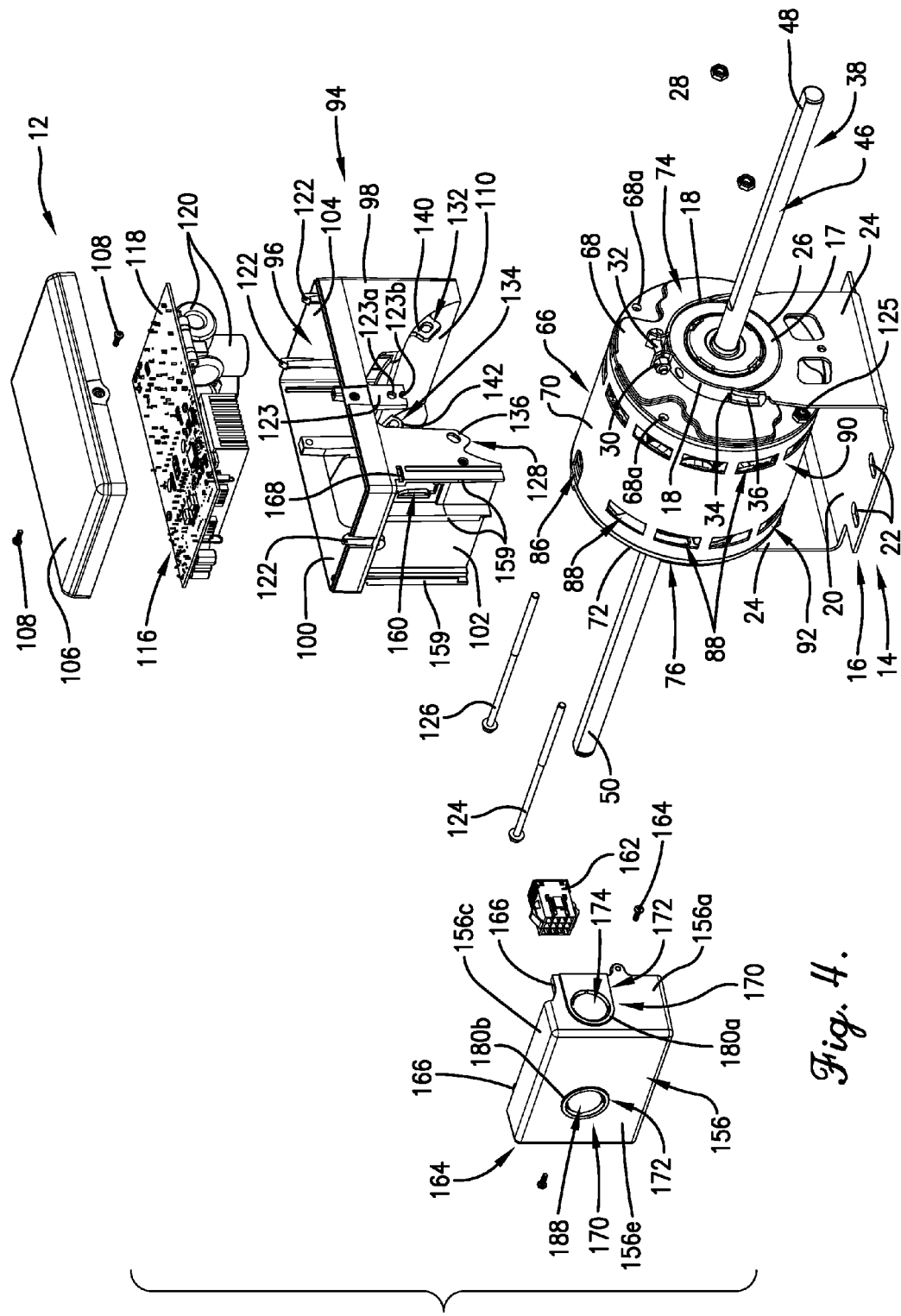
FIG. 4 is an exploded top, front perspective view of the motor of FIGS. 1-3.

Preferably, each knockout portion 174 is removable such that the corresponding reinforcing boss 172 and the corresponding wall 156a, 156b, 156d, or 156e cooperatively define an at least substantially unobstructed knockout opening 188 in communication with the auxiliary electronics compartment 158. Each knockout opening 188 preferably allows at least substantially unobstructed insertion of conduits, etc., into and out of the auxiliary controller housing 156. For instance, in FIG. 1, a conduit 190 is shown inserted through the knockout opening 188 (not visible in FIG. 1) in the side wall 156e of the auxiliary controller housing 156. As shown in FIGS. 3 and 4, the knockout opening 188 is unobstructed due to the absence of the corresponding disk and ribs.

The presence of multiple conduit connector assemblies 170 oriented in a variety of different directions is highly advantageous, allowing a user to configure conduits and/or other items requiring access to the auxiliary electronics compartment 158 and/or the electronics compartment 96 in a variety of manners, as best suited to the particular application.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A motor comprising:
a rotor rotatable about an axis;
a stator presenting opposite axial ends;
a motor shell extending around the axis to at least partly circumscribe the rotor and stator;
a pair of motor endshields, each being positioned adjacent a respective one of the stator ends and providing support for the rotor;
a fastener extending through the stator and extending through the endshields to thereby interconnect the stator and endshields,
said fastener being positioned at least in part radially inside the motor shell; and
a controller housing defining an electronics compartment positioned radially outside the motor shell,
said controller housing including a connector that extends radially inward past the motor shell,
said connector being received on the fastener so as to fix the controller housing to the stator and endshields.

2. The motor of claim 1,
said motor shell defining a connector-receiving opening,
said connector extending through said connector-receiving opening.

3. The motor of claim 1,
said connector comprising a tab defining a fastener-receiving opening therethrough.

4. The motor of claim 3,
said fastener-receiving opening having an at least substantially oval cross-section.

5. The motor of claim 1; and
a controller mounted on the controller housing,
said controller including a board and a plurality electronic components received in the electronics compartment.

6. The motor of claim 5,
said controller housing including a plurality of latches securing the controller to the controller housing.

7. The motor of claim 5,
said electronics components being potted in said housing.

8. The motor of claim 5,
said controller housing including a cover that at least substantially encloses the electronics compartment.

9. The motor of claim 8,
said electronics components being potted in said cover.

10. The motor of claim 5,
said controller housing including a wire-management tab configured to route wiring associated with the controller.

11. The motor of claim 1,
said motor including a first pair of said connectors,
said connectors of the first pair being axially spaced apart and at least substantially radially and angularly aligned,
said connectors of the first pair cooperatively receiving the fastener so as to fix the controller housing to the stator and endshields.

12. The motor of claim 11,
said motor including an additional fastener,
said motor including a second pair of said connectors,
said connectors of the second pair being axially spaced apart and at least substantially radially and angularly aligned,
said connectors of the second pair cooperatively receiving the additional fastener so as to fix the controller housing to the stator and endshields.

13. A motor comprising:
a rotor rotatable about an axis;
a stator presenting opposite axial ends;
a motor shell extending around the axis to at least partly circumscribe the rotor and stator;
a pair of motor endshields, each being positioned adjacent a respective one of the stator ends and providing support for the rotor;
a fastener extending through the stator and extending through the endshields to thereby interconnect the stator and endshields; and
a controller housing defining an electronics compartment positioned radially outside the motor shell,
said controller housing including a connector that receives the fastener so as to fix the controller housing to the stator and endshields,
said motor including a first pair of said connectors, said connectors of the first pair being axially spaced apart and at least substantially radially and angularly aligned,
said connectors of the first pair cooperatively receiving the fastener so as to fix the controller housing to the stator and endshields,
said motor including an additional fastener,
said motor including a second pair of said connectors,
said connectors of the second pair being axially spaced apart and at least substantially radially and angularly aligned,
said connectors of the second pair cooperatively receiving the additional fastener so as to fix the controller housing to the stator and endshields,
said connectors varying in shape,
each of said connectors defining a fastener-receiving opening therethrough,
said fastener-receiving openings of the first pair of connectors being at least substantially radially and angularly aligned,
said fastener-receiving openings of the second pair of connectors being at least substantially radially and angularly aligned.

14. The motor of claim 1,
said fastener being a bolt.

15. The motor of claim 1,
said shell including a curved outer surface,
said controller housing including a curved wall overlying the curved outer surface,
said outer surface and said curved wall having at least substantially similar radiuses of curvature.

16. The motor of claim 1,
said rotor including a shaft,
said shaft having a first end and a second end,
each of said ends extending past the axial ends of the stator.

17. The motor of claim 1,
said motor further comprising an auxiliary controller housing fixed to the controller housing,
said auxiliary controller housing at least in part defining an auxiliary electronics compartment positioned radially outside the motor shell,
said controller housing defining an aperture interconnecting the electronics compartment and the auxiliary electronics compartment.

18. A motor comprising:
a rotor rotatable about an axis;
a stator presenting opposite axial ends;
a motor shell extending around the axis to at least partly circumscribe the rotor and stator;
a pair of motor endshields, each being positioned adjacent a respective one of the stator ends and providing support for the rotor;
a fastener extending through the stator and extending through the endshields to thereby interconnect the stator and endshields;
a controller housing defining an electronics compartment positioned radially outside the motor shell,
said controller housing including a connector that receives the fastener so as to fix the controller housing to the stator and endshields; and
an auxiliary controller housing fixed to the controller housing,
said auxiliary controller housing at least in part defining an auxiliary electronics compartment positioned radially outside the motor shell,
said controller housing defining an aperture interconnecting the electronics compartment and the auxiliary electronics compartment,
said auxiliary controller housing including a plurality of non-coplanar walls and a plurality of conduit connector assemblies each associated with a different one of the walls so as to be oriented in a different directions,
each of said conduit connector assemblies including a knockout portion,
said knockout portion being removable, such that the corresponding wall at least in part defines an at least substantially unobstructed knockout opening in communication with the auxiliary electronics compartment.

19. The motor of claim 18,
said motor shell defining a connector-receiving opening,
said connector extending through said connector-receiving opening,
said connector extending generally radially through said connector-receiving opening,
said fastener being positioned at least in part radially inside the motor shell.

20. The motor of claim 18,
said knockout portion including a disk and at least one rib supporting the disk relative to the corresponding wall.

21. The motor of claim 1,
said motor presenting first and second axial margins,
said controller housing being positioned entirely between said margins.

22. The motor of claim 1,
said controller housing comprising plastic.

23. The motor of claim 1,
said motor configured to generate less than 1 horsepower.

24. The motor of claim 1,
said motor configured to be secured to a frame via a clamp system.

25. The motor of claim 1,
said motor configured to be secured to a frame via a mounting structure, with the mounting structure being generally diametrically opposed from the controller housing.

* * * * *